United States Patent
Fetfatsidis

(10) Patent No.: US 11,883,987 B2
(45) Date of Patent: Jan. 30, 2024

(54) SYSTEMS AND METHODS RELATING TO 3D PRINTING COMPOSITE STRUCTURES

(71) Applicant: MAKE COMPOSITES, INC., Burlington, MA (US)

(72) Inventor: Konstantinos A. Fetfatsidis, Tewksbury, MA (US)

(73) Assignee: DESKTOP METAL, INC., Burlington, MA (US)

( * ) Notice: Subject to any disclaimer, the term of this patent is extended or adjusted under 35 U.S.C. 154(b) by 116 days.

(21) Appl. No.: 17/258,549

(22) PCT Filed: Jul. 10, 2019

(86) PCT No.: PCT/US2019/041255
§ 371 (c)(1),
(2) Date: Jan. 7, 2021

(87) PCT Pub. No.: WO2020/014397
PCT Pub. Date: Jan. 16, 2020

(65) Prior Publication Data
US 2021/0154889 A1 May 27, 2021

Related U.S. Application Data

(60) Provisional application No. 62/696,245, filed on Jul. 10, 2018, provisional application No. 62/696,248, (Continued)

(51) Int. Cl.
*B29C 64/118* (2017.01)
*B29C 33/38* (2006.01)
(Continued)

(52) U.S. Cl.
CPC ........ *B29C 33/3842* (2013.01); *B29C 64/118* (2017.08); *B29C 64/194* (2017.08);
(Continued)

(58) Field of Classification Search
CPC ... B29C 70/386; B29C 70/388; B29C 64/188; B29C 33/485; B29C 33/52
See application file for complete search history.

(56) References Cited

U.S. PATENT DOCUMENTS

| 5,503,785 A * | 4/1996 | Crump | B33Y 40/20 264/308 |
| 11,292,224 B2 * | 4/2022 | Robrecht | B33Y 10/00 |

(Continued)

FOREIGN PATENT DOCUMENTS

| CN | 105538718 | 5/2016 |
| WO | 2015164954 | 11/2015 |

OTHER PUBLICATIONS

PCT International Search Report and PCT Written Opinion for PCT International Patent Application No. PCT/US2019/041255 (17 pages).

*Primary Examiner* — Matthew J Daniels
(74) *Attorney, Agent, or Firm* — K&L GATES LLP

(57) ABSTRACT

In part, the disclosure relates to systems and methods of layer-by-layer assembly of composite structures such as for parts or workpieces. Various additive and subtractive processes can be used. In various embodiments, prepreg tapes that include continuous reinforcing fibers are used. In one aspect, a system that includes printer heads is provided. The printer heads may, in some embodiments, be used for manufacturing high quality continuous fiber reinforced structural parts. In some embodiments, the system includes a first printer head configured to lay down tape (e.g., a thermoplastic tape that includes reinforcing fibers).

13 Claims, 9 Drawing Sheets

Related U.S. Application Data filed on Jul. 10, 2018, provisional application No. 62/696,254, filed on Jul. 10, 2018, provisional application No. 62/696,262, filed on Jul. 10, 2018, provisional application No. 62/700,423, filed on Jul. 19, 2018, provisional application No. 62/700,432, filed on Jul. 19, 2018, provisional application No. 62/700,435, filed on Jul. 19, 2018.

(51) Int. Cl.
*B29C 64/194* (2017.01)
*B29C 64/209* (2017.01)
*B29C 70/34* (2006.01)
*B29C 70/38* (2006.01)
*B33Y 10/00* (2015.01)
*B33Y 30/00* (2015.01)
*B33Y 40/00* (2020.01)

(52) U.S. Cl.
CPC .......... *B29C 64/209* (2017.08); *B29C 70/34* (2013.01); *B29C 70/388* (2013.01); *B33Y 10/00* (2014.12); *B33Y 30/00* (2014.12); *B33Y 40/00* (2014.12)

(56) References Cited

U.S. PATENT DOCUMENTS

| | | | | |
|---|---|---|---|---|
| 11,440,273 | B2* | 9/2022 | Gill | B29C 70/443 |
| 2007/0095451 | A1* | 5/2007 | Kramp | B29C 70/386 |
| | | | | 156/64 |
| 2014/0190629 | A1* | 7/2014 | Benson | B29C 65/36 |
| | | | | 156/379.6 |
| 2014/0328963 | A1 | 11/2014 | Mark et al. | |
| 2015/0290883 | A1* | 10/2015 | Beraud | B29C 70/38 |
| | | | | 156/164 |
| 2016/0089863 | A1 | 3/2016 | Fetfatsidis et al. | |
| 2016/0238324 | A1 | 8/2016 | Butcher et al. | |
| 2016/0257033 | A1* | 9/2016 | Jayanti | B33Y 80/00 |
| 2017/0021565 | A1* | 1/2017 | Deaville | B33Y 30/00 |
| 2017/0197371 | A1 | 7/2017 | Fetfatsidis et al. | |
| 2017/0210074 | A1 | 7/2017 | Ueda et al. | |
| 2017/0232674 | A1 | 8/2017 | Mark | |
| 2019/0366574 | A1 | 12/2019 | Bosworth et al. | |
| 2019/0375171 | A1 | 12/2019 | Choi et al. | |
| 2020/0023537 | A1 | 1/2020 | Fetfatsidis et al. | |
| 2020/0117271 | A1 | 4/2020 | Bosworth et al. | |

* cited by examiner

SYSTEMS AND METHODS RELATING TO 3D PRINTING COMPOSITE STRUCTURES

CROSS REFERENCE TO RELATED APPLICATIONS

This application is the national phase under 35 U.S.C. § 371 of International Application No. PCT/US2019/041255, filed on Jul. 10, 2019, which claims priority to and the benefit of U.S. provisional patent application No. 62/696,245, filed on Jul. 10, 2018 and entitled "Systems and Methods Relating to Printing Heads for Layer-by-Layer Assembly of Composite Structures," U.S. provisional patent application No. 62/696,248, filed on Jul. 10, 2018 and entitled "Systems and Methods Relating to Splice Detection and Removal for 3D Printing," U.S. provisional patent application No. 62/696,254, filed on Jul. 10, 2018 and entitled "Active Cooling of Rollers in 3D Printing System," U.S. provisional patent application No. 62/696,262, filed on Jul. 10, 2018 and entitled "Systems and Methods Relating to Subtractive Processing During 3D Printing," U.S. provisional patent application No. 62/700,423, filed on Jul. 19, 2018 and entitled "Recyclable Heating and Cooling System in 3D Printing System," U.S. provisional patent application No. 62/700,432, filed on Jul. 19, 2018 and entitled "Systems and Methods Relating to Tool Changing for 3D Printing Processes," and U.S. provisional patent application No. 62/700,435, filed on Jul. 19, 2018 and entitled "Deposition of Non-Stick Layers in Layer-by-Layer 3D Printing Processes," the disclosures of all of the foregoing are herein incorporated by reference in their entirety.

BACKGROUND

Designing and building specialized manufacturing systems and facilities is expensive. Further, creating custom tooling for new products is also a costly endeavor. Clearly there are numerous barriers facing the release of new products that can improve the quality of our lives. This issue applies to final product designs, but also serves as an impediment to prototyping and manufacturing new products.

The advancement of medicine, sports, aviation, safety equipment, and other industries and technologies can all benefit from rapid prototyping and manufacture of new products. To that end, various technologies are undergoing further development to facilitate rapid prototyping and manufacturing parts having enhanced strength and weight characteristics. Advances in computer added design, three-dimensional printing, such as Fused Filament Fabrication (FFF), and others are creating new design options and making new technologies available to engineers.

Unfortunately, some of these technologies are difficult to combine or otherwise use in an integrated fashion. Further, prototyping or manufacturing parts using materials that are processed with heat adds complexity to a given system. The present disclosure addresses these challenges and others.

SUMMARY

In part, the disclosure relates to systems and methods of layer-by-layer assembly of composite structures such as for parts or workpieces. Various additive and subtractive processes can be used. In various embodiments, prepreg tapes that include continuous reinforcing fibers are used. In one aspect, a system that includes print heads is provided. The print heads may, in some embodiments, be used for manufacturing high quality continuous fiber reinforced structural parts. In some embodiments, the system includes a first printer head configured to lay down tape (e.g., a thermoplastic tape that includes reinforcing fibers). Reference to a first, second, or third print head can be used to refer to different print heads disclosed herein without limitation.

In certain embodiments, the system further includes a second printer head configured to deposit material (e.g., by extruding polymeric filaments) such a through a FFF-based process. In some cases, the first printer head and the second printer head may be used together to rapidly fabricate high quality structural parts suitable for a variety of applications (e.g., aerospace-grade composite material systems at aerospace quality). In some aspects, the fabrication of the composite structures occurs via additive and/or subtractive processes. The system may, in some embodiments, may include multiple print heads. One or more non-stick layers may be used during the additive, subtractive, and other types of layer-by-layer assembly of materials.

In some embodiments, the second printer head deposits a mold structure, and, subsequently, the first printer head lays down a layer of tape onto the mold structure (an additive process), and machines the laid-down tape (e.g. via ultrasonic cutting or milling, a subtractive process). In some embodiments, the first printer head then lays down an additional layer of tape and consolidates the additional layer of tape with the laid-down tape (e.g., via a combination of heat and/or compaction force). In some embodiments, the first printer head and second head are robotically controlled. The methods and systems herein may, in certain embodiments, allow for the automated manufacture of composite structures in a single working cell, thereby increasing efficiency without sacrificing the quality and/or performance of the composite structures (e.g., without sacrificing performance in aerospace applications). In some embodiments, the second printer head deposits a mold structure, and, subsequently, the first printer head lays down and/or machines/trims one or more layers of tape onto the mold structure (as additive and subtractive processes, respectively). In one embodiment, the steps are performed in the working/printing region or volume of one device. Curing, autoclaving, or other processes typically performed in separate working cells or stations are avoided.

In part, the disclosure relates to a method of manufacturing a part. The method includes printing a three-dimensional support, using a fused filament fabrication-based print head, wherein the support comprises layers of fused polymer filament; heating one or more segments of prepreg thermoplastic tape, using a heating element disposed in a tape deposition head; depositing one or more heated segments of prepreg thermoplastic tape on the three-dimensional support in one or more directions; compacting, the one or more segments of prepreg thermoplastic tape such that the one or more segments conform to the support; and repeating depositing and compacting steps and periodically changing the one or more directions until a fiber-reinforced multi-layer part comprising one or more surfaces is formed, wherein at least one surface of the one or more surfaces is defined by the support.

In one embodiment, the support is a mold defining one or more shaped regions or volumes, wherein the one or more shaped region are covered by alternating arrangement of the one or more segments. In one embodiment, the compacting step is performed using a compaction roller, wherein tape deposition head comprises the compaction roller. In one embodiment, the compaction roller comprises an elongate bore defined by a unitary body, wherein unitary body defines a plurality of holes or channels. The method may further include depositing one or more regions of non-stick material using the fused filament fabrication-based print head. The method may further include removing a first volume of compacted layers of thermoplastic tape segments using a subtractive device. In one embodiment, the first volume is defined by one or more regions of non-stick material.

In one embodiment, the method may further include cooling compaction roller of deposition head using a fan to direct air having a first temperature relative to surface of compaction roller such that temperature of compaction roller decreases. The method may further include directing heated air from compaction roller having a second temperature to one or more heating elements disposed in deposition head, wherein second temperature is higher than first temperature.

In one embodiment, all steps are performed in a working region of a printing system, wherein working region is within housing of printing system. The method may further include covering a first surface of support with a sufficient number of segments of prepreg thermoplastic tape such that the first surface is covered. The method may further include detecting a splice in a section of prepreg thermoplastic tape. The method may further include cutting prepreg thermoplastic tape relative to the section; and removing splice. In one embodiment, the support is a lattice or honeycomb core. In one embodiment, the support is disposed within or remains integral with fiber-reinforced multi-layer part. The method may further include removing the support, wherein support is disposable.

In part, the disclosure relates to a composite part fabrication system. The system may include one or more of a housing; a print bed disposed within the housing; a gantry disposed above the print bed; a rotatable print head; and a rotatable prepreg thermoplastic tape deposition head comprising a first heat source and one or more compaction rollers, the deposition head translatable relative to print bed using the gantry. The system may further include a rotatable subtractive device, the rotatable subtractive device translatable relative to the print bed. In one embodiment, the print head includes a splice detector. In one embodiment, the print head includes a printable non-stick material. In one embodiment, the print head is a fused filament fabrication-based print head comprising a second heat source, the print head translatable relative to print bed using the gantry. In one embodiment, one or more compaction rollers include a body defining a longitudinal bore, wherein body includes a metal, wherein body defines a plurality of holes or channels.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF DRAWINGS

The figures are not necessarily to scale, emphasis instead generally being placed upon illustrative principles. The figures are to be considered illustrative in all aspects and are not intended to limit the disclosure, the scope of which is defined only by the claims.

DETAILED DESCRIPTION

The system and methods described herein, in accordance with certain embodiments, allows for the manufacture of high quality composite parts without direct touch labor or consumables, by leveraging thermoplastic materials (e.g., using tapes that includes fibers impregnated into thermoplastic polymers) and performing consolidation steps in situ, thereby reducing process cycle time. The use, in some embodiments, of material pre-impregnated with fibers allows for a fully integrated system wherein the first printer head uses rollers to lay fiber-impregnated tape on to a mold structure or support structure printed by the second printer head and consolidate the resulting laminate with a combination of heat and/or applied force 180. In some embodiments, a system for manufacturing composite structures via a layer-by-layer technique is generally described. A given support, such as an FFF printed support can be integral or unitary with a part or workpiece that is also formed using composite tape deposition/printing as disclosed herein.

Figure 1:
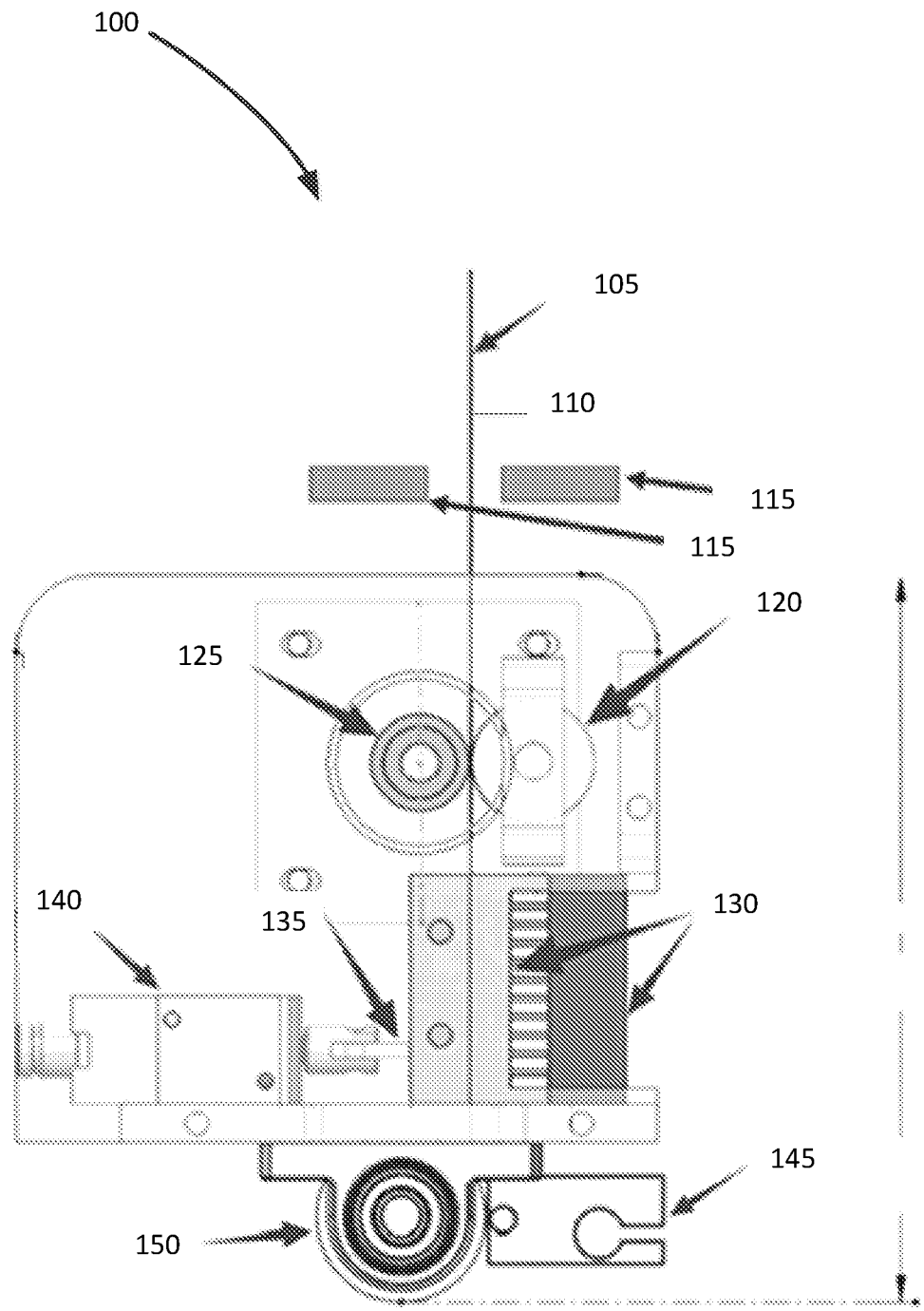
FIG. 1 is a cross-sectional schematic diagram of a printer head, in accordance with embodiments described herein.

In some embodiments, the system includes a first printer head 100. FIG. 1 depicts an exemplary cross-sectional schematic representation of the first printer head 100, in accordance with certain embodiments. In some embodiments, the first printer head 100 is configured to lay down tape 105 on to a surface (e.g., a mold structure/support laid down by the second printer head, as described herein). In some embodiments, the first printer head 100 provides a pathway within the housing of the first printer head 100 through which the tape 105 can be driven. FIG. 1 shows, in accordance with certain embodiments, tape 105 (e.g., "prepreg tape") following a pathway within the housing of the first printer head 100.

In some embodiments, the tape 105 is pre-impregnated tape. As used herein, pre-impregnated tape 105 refers to tape that includes fibers, wherein the tape includes the fibers before the introduction of the tape to the first printer head. In some embodiments, the tape includes a matrix of thermoplastic material (e.g., a thermoplastic polymer). In various embodiments, the fibers are continuous fibers.

In some embodiments, the first printer head 100 includes one or more feed rollers 125 attached to the head 100 and configured to drive tape 105 through the head 100. FIG. 1 shows exemplary tape feed rollers 125. A tape feed roller tensioning device or idler 120 is also included in the head 100 in some embodiments. In some embodiments, the gap between the feed rollers 125 is adjustable to accommodate different thicknesses in material systems (e.g., different thicknesses of tapes). In some embodiments, the first printer head 100 includes a heatsink 130 (e.g., a tape feed heatsink), as described herein. In some embodiments, the tape 105 passes through and comes into contact with the heatsink 130 as the tape 105 is fed through the first printer head 100. In some embodiments, the first printer head 100 further includes a tape cutting blade 135 and an article configured to drive the blade, such as tape cutting solenoid 140. In some embodiments, the blade 135 is an angled blade. The print head 100 can include one or more compaction rollers for compacting tape disposed on support, mold, or print bed or other surfaces.

Examples of articles configured to drive the blade include, but are not limited to, solenoids 140 (as pictured in FIG. 1) and servos. The article configured to drive the blade (e.g., the solenoid), upon actuation, may cause the blade to move in such a way that it cuts the tape 105 as the tape 105 is fed through the first head 100. In some embodiments, the blade 135 enters into and out of the heatsink 130 as it cuts the tape 105. In some embodiments, the heatsink 130 is modular (e.g., so as to accommodate different thicknesses of tapes and/or blades. FIG. 1 shows the blade 135 ("tape cutting blade"), solenoid 140 ("tape cutting solenoid"), and heatsink 130 ("heatsink and cooling element"), in accordance with certain embodiments.

The print head 100 may include one or more detectors 115. As show, a first detector 115 and a second detector 115 are shown relative to tape 105. In one embodiment, the detectors 115 are a detecting subsystem that includes a source and receiver or transceiver. In one embodiment, such as subsystem includes a light source and light detector such as a photodiode. These detectors 115 can be used to detect changes in the tape 105 or other tape features such as tape splices 110. An exemplary tape splice 110 is shown.

Spools of prepreg tape are often manufactured by splicing together different lengths of tape to fabricate a larger spool. In part, the disclosure facilitates the detection or tracking of splices prior to a given splice being incorporated into a final part of workpiece. The detector is in communication with one or more controllers that generate signals to track splices in a given part of cut a given tape run on either side of a splice such that the splice is removed. In this way, the number of splices present in a given part can be regulated. In one embodiment, all splices are removed such that a given part fabricated using spliced tape or filament is free of splices or has less than or equal to S splices, wherein S ranges from 0 to about 20. Splices are cut out and disposed of in various embodiments.

In some embodiments, the system includes a second printer head. In some embodiments, the second printer head is configured to deposit material (e.g., by extruding plastic filaments). The material can include any suitable polymer material suitable for FFF-based printing. In some embodiments, the material deposited by the second printer head includes polycarbonate, acrylonitrile butadiene styrene (ABS), or any other suitable material. For example, in some embodiments, the second printer head is a fused filament fabrication (FFF) extrusion head.

The second printer head may, in certain embodiments, print out a mold prior to the first printer head laying down the tape (e.g., the second printer head prints a mold designed for form of the desired composite structure, and then the first printer head lays down layers of tape on to the mold, with the mold acting as a support or a honeycomb core, lattice, or other support). This avoids a manual mold making step or transitioning to another processing stage or work cell. In some embodiments, the first printer head and/or the second printer head are capable of interfacing with any XYZ gantry motion platform (e.g., any three-dimensional translation stage). The use of such platforms may assist in the automated nature of the system and methods described herein.

In some embodiments, after the tape is fed through the first printer head (e.g., via the feed rollers) and cut (e.g., via the blade), the tape is heated by a heating element 145. Any element capable of heating the tape to a temperature above the melting temperature of the thermoplastic of the tape may be suitable. For example, in some embodiments, the heating element is a heat block. In some embodiments, the heat block (e.g., a copper heat block) is heated by a thermistor, while a thermocouple monitors and controls the temperature of the heat block via a feedback loop. In some embodiments, the heating element heats the tape by coming into contact with tape as the tape is fed through the first printer head. In some embodiments, however, the heating element heats the tape without contacting the tape.

For example, in some embodiments, the heating element is an infrared lamp capable of radiating heat in the form of electromagnetic radiation toward the tape. In some embodiments, the heating element is capable of heating both the tape being fed through the first printer head (e.g., "incoming tape") and the previously laid down layer of tape on the mold/support. Heating the tape being fed through the head (i.e., the tape being laid down) as well as the previous layer of tape can be beneficial in consolidating the two layers of tape (e.g., via thermal bonding of the two layers). FIG. 1 depicts a heating element 145, in accordance with certain embodiments.

Figure 2:
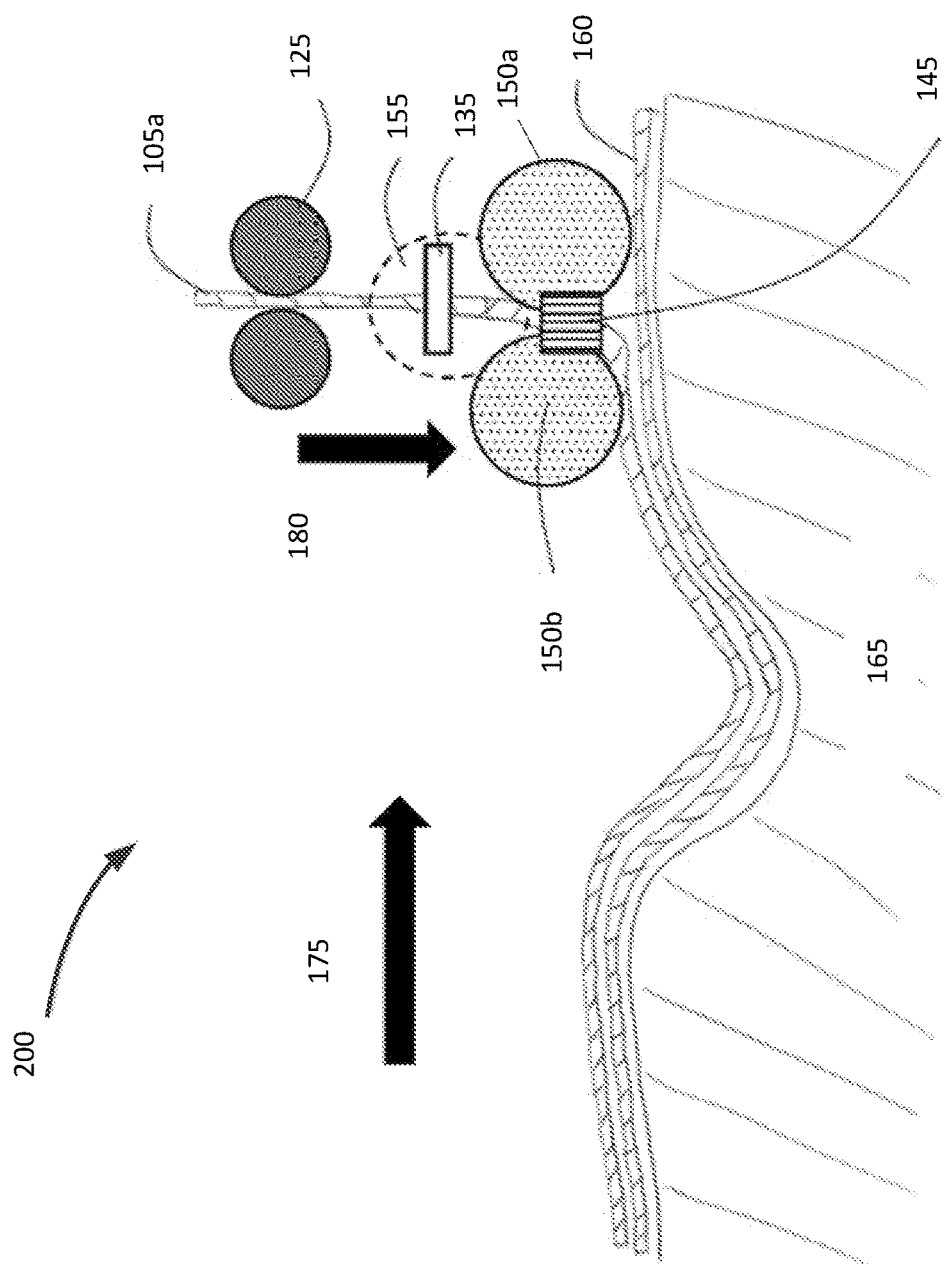
FIG. 2 is a schematic diagram showing a compaction roller in use and a printed support, in accordance with embodiments described herein.

In some embodiments, the first printer head includes a compaction roller 150. In some embodiments, the first printer head includes at least two compaction rollers (as shown in the non-limiting embodiment illustrated in FIG. 2. In other embodiment, a single compaction roller is used. FIG. 1 shows an exemplary compaction roller, in accordance with certain embodiments. The compaction roller(s) may be positioned in close proximity to the part of the first printer head that extrudes the tape and lays it down on to the mold/support 165. The compaction roller may, in some embodiments, provide downward pressure or a compaction force 180 (e.g., in the direction toward the mold) so as to flatten the material and provide necessary compaction pressure for consolidation. FIG. 2, which shows the laying down of tape by the first printer head on to a support previously printed by the second printer head, in accordance with certain embodiments.

FIG. 2 also illustrates a schematic of the various components of the first printer head described herein. The various print heads disclosed herein are rotatable in some embodiments. The first printer head travels in a direction 175 relative to the position of the support 165 as it lays down the tape. The first printer head may be rotatable, in some embodiments. Having a rotatable printer head may allow tape to be laid down in multiple directions, resulting in a composite structure with multiple fiber orientations. In some embodiments, the first printer head can rotate 180 degrees. In some embodiments, the first printer head can rotate up to 360 degrees. The support 165 is printed in one embodiment. The support 165 can be disposable such as by washing with a solvent or other liquid or by melting in some embodiments. The compaction force 180 is shown directed towards support 165. The force direction can vary based on placement of print bed or support.

As mentioned herein, in some embodiments, the first printer head, second printer head, and/or a third printer head may include a subtractive manufacturing element. The subtractive manufacturing element is used, in some embodiments, to trim edges and cut features (e.g., according to the part design) in the structure formed by the laid-down tape. In some embodiments, the subtractive manufacturing element performs a subtractive manufacturing process between the laying down of each tape layer. In one embodiment, the subtractive manufacturing element is a cutter, a drill, an excavator, a scoring device, an ultrasonic cutter and/or other materials removal devices.

Optionally, the second printer head may, in certain embodiments, print out a support 165 such as honeycomb (or other type of lattice) core structures and any other support material for the composite structures. In some embodiments, a support or core, such as the honeycomb lattice stays with the part following manufacture. In other embodiments, the honeycomb structure is removed (e.g., via washing or depolymerization). Thus, in one embodiment, a support printed for tape laydown is disposable.

Splice Detection and Management Features for Part Fabrication

Systems and methods relating to the splice detection and removal during printing processes are generally described. In one aspect, a system that includes a detector is described. In some embodiments, the detector is attached to a printer head, wherein the printer head is configured to lay down tape (e.g., fiber-reinforced unidirectional pre-impregnated tape). In some embodiments, the detector can detect the presence of splices in the tape as the tape is being fed through the printer head.

In some embodiments, the detector is in communication with a cutting mechanism (e.g. a blade). The detector, may, in accordance with certain embodiments, detect the presence of a splice in the tape and send a signal to the cutting mechanism indicating the presence of the splice, so that the cutting mechanism can cut the tape before the splice is laid down (e.g., on to a composite part being manufactured by the printer head, as in a 3D printing process). In such a way, the system described herein may, in certain embodiments, prevent tape containing a splice to be laid down during a 3D-printing process.

Splices in tapes (e.g., pre-impregnated tapes) are generally introduced when ends of slit tape are spliced together. Splicing generally involves creating regions of overlapping tape material, thereby creating regions of the tape having increased thickness. These splices are generally undesirable during the manufacturing of, for example, high quality composite structures for aerospace applications. Typically, when slices are laid down during a manufacturing process, the splice must be visually detected and the manufacturing process must be paused so that the splice can be removed manually, thereby increasing process cycle times. The systems and methods described herein may, in some embodiments, allow for automated splice detection and removal without requiring the manufacturing process to be paused.

In some embodiments, the system includes a printer head. The printer head may be used, in some embodiments, for the laying down of tape pre-impregnated with fibers, as described that includes. An exemplary length of tape or filament 105 is shown in FIG. 1 that includes a splice 110. In some embodiments, the printer head is the first printer head described in the system herein. FIG. 1 shows an exemplary cross-sectional schematic of a printer head embodiment 100. Generally, the printer head 100 operates by feeding incoming tape through the head via tape feed rollers. In some embodiments, the tape passes through a pathway in the printer head before exiting and being laid down. In some embodiments, the tape that is laid down by the printer head includes splices.

In some embodiments, the printer head includes a detector. In some embodiments, the tape includes more than one detector. In some embodiments, the detector 115 is positioned in the printer head (e.g., the first printer described herein) such that the detector can monitor the tape as it drives through the printer head. Such a configuration is depicted in FIG. 1. In other embodiments, the detector 115 is positioned outside of the printer head, but is in communication with the printer head. In some embodiments, the detector is positioned such that the tape passes by the detector before the tape reaches the tape feed rollers. In some embodiments, the detector 115 is capable of detecting the presence of a splice in the tape as the splice passes by the detector.

Any type of detector capable of generating a signal (e.g., an electrical signal or a visual signal) when a splice passes by the detector is suitable. For example, in some embodiments, the detector is a visual camera that allows for the identification of splice markings as the splice travels by the detector. In some embodiments, the detector is any device capable of detecting certain changes in color (e.g., an optical sensor coupled to a spectrometer). In some embodiments, the detector is an ultrasonic transducer capable of measuring thickness changes.

In accordance with certain embodiments, the detector generates a signal upon detection of a splice, while the tape 110 is still traveling through the printer head. In some embodiments, the system uses an algorithm to calculate the distance between the splice and a cutting mechanism attached to the printer head (e.g., a tape or filament cutting blade 135, as shown in FIG. 1). The system actuates the cutting mechanism and cuts the tape before the splice exits the printer head and is laid down (e.g., on a composite structure, support or mold). The splice can be routed or dropped into a waste container or otherwise segregated for disposal.

In some embodiments, the printer head is physically translated away from the part being manufactured upon detection of the splice and before the splice is laid down on the part. In some such embodiments, the printer head is translated to a second, off-part location, where it lays down the portion of the tape that includes the splice. Upon deposition of the splice in the second location, the printer head may return to the part being manufactured in order to continue laying down tape on the part.

As mentioned herein, the system for splice detection may be, but is not necessarily, included in a system for manufacturing composite structures via a layer-by-layer technique generally described herein. In some embodiments, splice-free prepreg tape is used.

Roller Cooling Features and Embodiments

Systems and methods relating to the active cooling of rollers used in printing processes are generally described. In some embodiments, rollers are used in a printing process (e.g., a three-dimensional printing process for laying down fiber-reinforced pre-impregnated tape to manufacture composite structures). In some cases, the rollers are compaction rollers. The compaction rollers may be used to guide and/or apply pressure to the material being printed. For example, in one non-limiting embodiment, the rollers are compaction rollers that apply pressure to consolidate fiber-reinforced pre-impregnated tape as it is being laid down (e.g., by a printer head).

In some, but not all, embodiments, the compaction rollers are attached to a printer head that is part of an automated system for layer-by-layer manufacture of composite structures as described herein (i.e., in some embodiments, the roller are the compaction rollers in the first printer head described herein). In some embodiments, the pre-impregnated tape includes a thermoplastic material. Tapes that include thermoplastic materials may be heated above the melting temperature of the thermoplastic material as the tape is being laid down (e.g., to assist in bonding the tape to a previous layer 160). In some cases, it is desirable to cool the tape as quickly as possible once it is laid down in order for the structure to consolidate and solidify. Having a rapid change in temperature may, in some embodiments, speed up the consolidation process and therefore speed up the process cycle for manufacturing the composite. The systems and methods described herein describe a low-cost method for the active cooling of the rollers, so that, in some embodiments, the rate at which the tape cools is increased, without significant expenditure of resources.

In one aspect, rollers are described. In some embodiments, the rollers are compaction rollers. FIG. 1 shows an illustration of an exemplary compaction roller, in accordance with certain embodiments. The rollers can be made of any suitable material. In some embodiments, the rollers may include materials having a high thermal conductivity. Selecting a material, such a metal or other materials, having a high thermal conductivity may, in accordance with certain embodiments, allow for faster cooling of the rollers.

In some embodiments, the rollers may include a metal or metal combined with other materials. For example, in some embodiments, the rollers (e.g., compaction rollers) may include aluminum, steel, copper, titanium, chromium, nickel, zinc, metal alloys, or combinations thereof. In some embodiments, at least 50 vol %, at least 75 vol %, at least 90 vol %, at least 95 vol %, at least 99 vol %, or more of the rollers are made up of metal. In some embodiments, the rollers may include holes around the outer perimeter of the rollers.

Heat Directing and Cooling Features

Systems and methods relating to recyclable heating and cooling in 3D printing processes are generally described. The recyclable heating and cooling system includes, in accordance with certain embodiments, a printer head (e.g. a printer head for laying down fiber-reinforced thermoplastic tape to make composite structures) configured to direct relatively cool fluid (e.g., ambient air) toward a component of the printer head (e.g., a roller or heatsink) such that heat is transferred from the component to the fluid, thereby cooling the first component and heating the fluid. The recyclable heating and cooling system also involves, in certain embodiments, the printer head being configured to subsequently direct the heated fluid to a heating element (e.g., a heat block or coil), thereby heating the heating element and/or gas (e.g., air) in close proximity to the heating element.

In one embodiment, the heated gas may be used for heating and/or bonding thermoplastic tape strands during layer-by-layer printing of composite structures. The use of such a recyclable heating and cooling system, which in some embodiments, takes advantage of convective heat flow, may improve the efficiency and safety of print heads in certain printing 3D printing processes, especially in comparison to other possible non-contact heating methods, such as those that use lasers, torches, or infrared lamp heating elements.

In some embodiments, rollers are used in a printing process. The rollers may be a component that is cooled by the recyclable heating and cooling process described herein. In some cases, the rollers are compaction rollers. The compaction rollers may be used to guide and/or apply pressure to the material being printed. For example, in one non-limiting embodiment, the rollers are compaction rollers that apply pressure to consolidate fiber-reinforced pre-impregnated tape as it is being laid down (e.g., by a printer head). In some, but not all, embodiments, the compaction rollers are attached to a printer head that is part of an automated system for layer-by-layer manufacture of composite structures as described herein (i.e., in some embodiments, the roller are the compaction rollers in the first printer head described herein). In some embodiments, the pre-impregnated tape includes a thermoplastic material.

Tapes that include thermoplastic materials may be heated (e.g., with by a heating element) to a temperature above the melting temperature of the thermoplastic material as the tape is being laid down (e.g., to assist in bonding the tape to a previous layer). In some cases, it is desirable to cool the tape as quickly as possible once it is laid down in order for the structure to consolidate and solidify. Having a rapid change in temperature may, in some embodiments, speed up the consolidation process and therefore speed up the process cycle for manufacturing the composite. The systems and methods described herein describe a low-cost method for the active cooling of the rollers, so that, in some embodiments, the rate at which the tape cools is increased, without significant expenditure of resources. Moreover, the systems and methods herein describe the recycling of the heat removed from the rollers so that the heat may, in some embodiments, be transferred to components that are desired to be heated (e.g., a heating element and/or gas in contact or proximity to the heating element).

FIGS. 1, 2, 3A, 3B and 4 show an illustrations of exemplary compaction rollers (150 generally, and exemplary embodiments, 150a, 150b, 150c, 150d, and 150e, in accordance with certain embodiments. The rollers can be made of any suitable material. In some embodiments, the rollers may include materials having a high thermal conductivity. Having a high thermal conductivity may, in accordance with certain embodiments, allow for faster cooling of the rollers. In some embodiments, the rollers may include a metal.

Figure 3A:
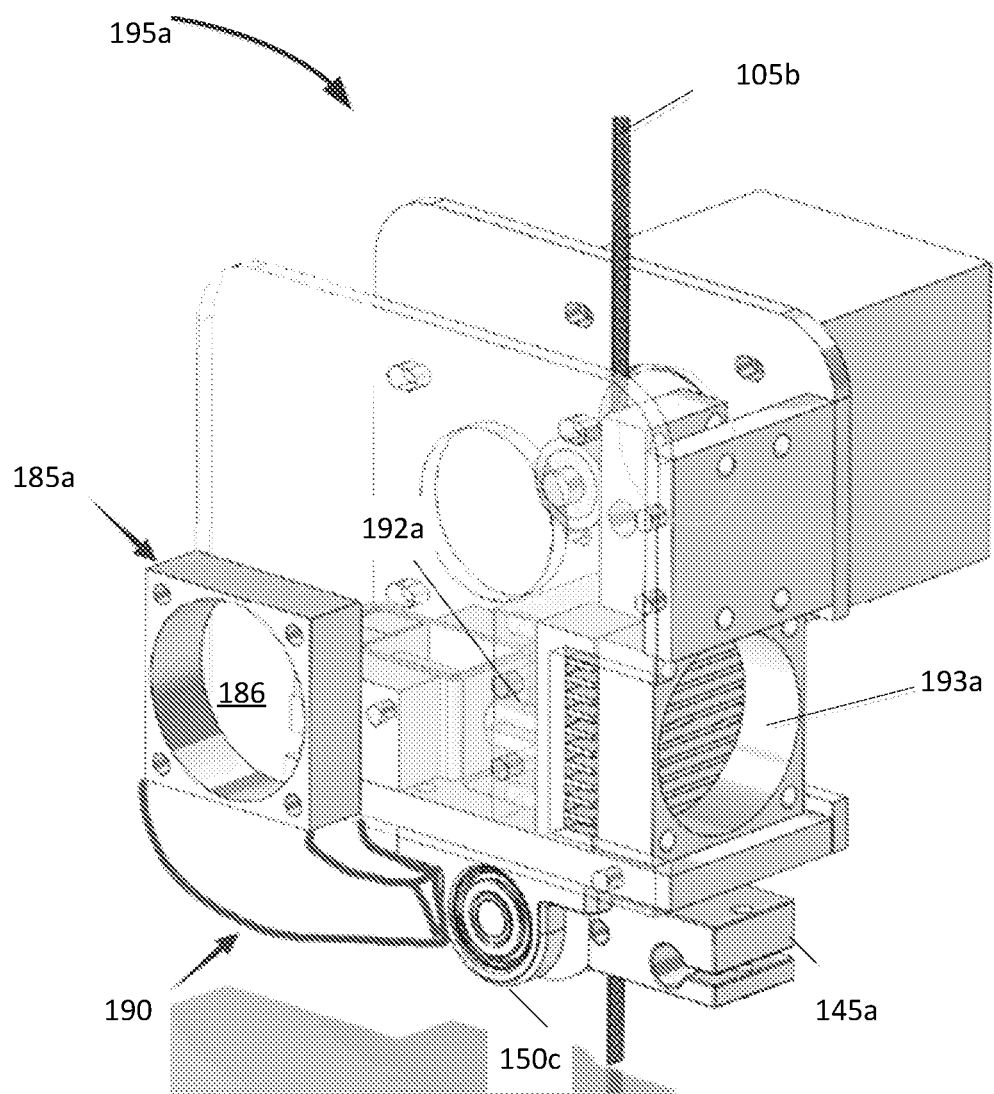
FIGS. 3A and 3B show perspective views of a printer head that include heating and cooling directing systems, in accordance with embodiments described herein.
Figure 3B:
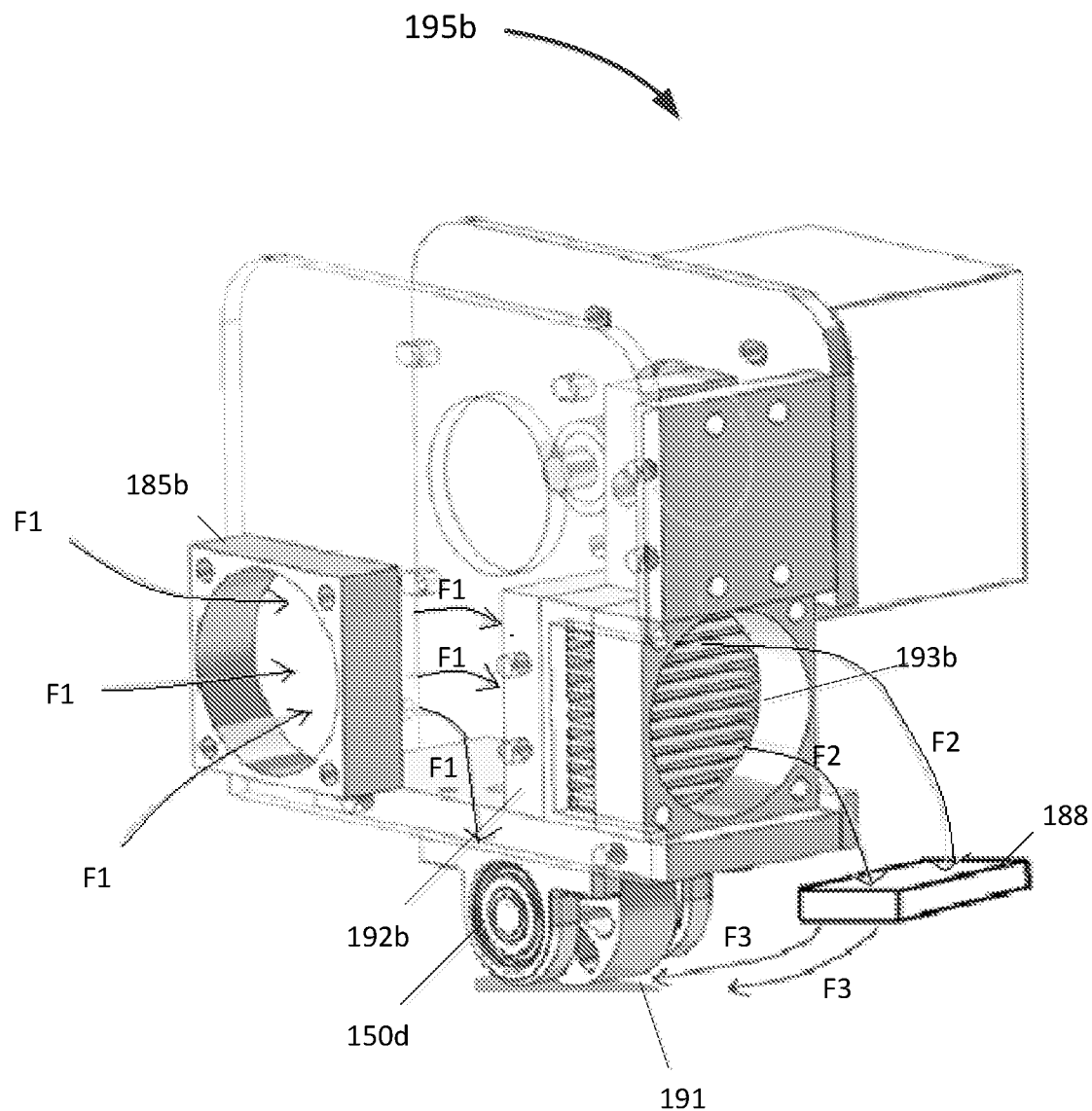

FIG. 3A illustrates an exemplary 3D schematic of a printer head 195a that includes an exemplary recyclable heating and cooling system descried herein. Similarly, FIG. 3B illustrates an exemplary 3D schematic of a printer head 195b that includes an exemplary recyclable heating and cooling system described herein and shows additional details relating to fluid flow and movement relative to printer head 195b components.

FIG. 3A depicts a print head 195a that includes a compaction roller 150c. One or more cooling devices, such as fans can be used to cool the compaction roller 150c. These devices 185a, such as a fan, may be attached or coupled to the print head 195a. Air directed into the channel 186 from device 185*a* flows to and is directed by cooling duct 190. Various ducts such as duct 190 can be positioned and configured to direct air toward one or more components of the print head 195*a*. An additional cooling system that includes a heatsink 192*a* and an additional cooling device are shown as cooling system 193*a*. Heating element 145*a* is used to heat tape or filament 105*b*. In various embodiments, prepreg tape with a continuous fiber and a thermoplastic matrix is used. Other tapes, including other prepreg tapes may be used to build various parts, workpieces, supports, or molds.

In some embodiments, the system described herein includes a first device 185*b* (185*a* in FIG. 3A) configured to direct fluid. Device 185*b* may be a fan, blower, or other fluid or air directing device. The first device 185*b* may be used for cooling one or more components of a printer head, such as print heads 195*a*, 195*b*, of FIGS. 3A and 3B (e.g., the compaction rollers of a printer head and/or a tape feed heatsink). The device may, in certain embodiments, be capable of directing fluid toward the one or more components. FIG. 3B depicts first device 185*b*, which is configured to direct fluid F1 (depicted as arrows) toward one or more components of the printer head. In accordance with certain embodiments, first device 185*b* is a fan, and fluid F1 is ambient air. Referring again to FIG. 3B, in accordance with certain embodiments, first device 185*b* directs fluid F1 toward compaction roller 150*d* and/or heatsink 192*b*. The first device may direct the fluid toward the one or more components via a duct (not picture in FIG. 3B).

In some embodiments, the temperature of the fluid is lower than the temperature of the rollers and/or the heatsink. Therefore, in some embodiments, heat is transferred from the one or more components of the printer head (e.g., the rollers and/or heatsink) to the fluid, thereby cooling the one or more components and heating the fluid. For example, in some embodiments, heat is transferred from compaction roller 150*d* and/or heatsink 192*b* to fluid F1 after it is directed by first device 185*b*, thereby cooling compaction roller 150*d* and/or heatsink 192*b* and heating fluid F1, which, when heated, is referred to in FIG. 3B as heated fluid F2 (depicted as arrows). In some, but not all, embodiments, the fluid directed toward the component(s) by the device is a gas (e.g., air). In some embodiments, the fluid directed toward the component(s) is a liquid (e.g., a cooled liquid).

In some embodiments, the first device 185*b* is a fan. The fan may, in certain embodiments, blow air at the rollers while the rollers 150*d* are in operation. For example, in some embodiments, the rollers are compaction rollers as part of a printer head (e.g., the first printer head described herein), and as the compaction rollers apply pressure to heated pre-impregnated tape, the fan flows air at the compaction rollers. In some cases, this active air flow F1 contributes to faster cooling of the compaction rollers than passive cooling methods (such as methods in which the compaction rollers are exposed only to non-actively directed, room-temperature air).

In some embodiments, the heated fluid (i.e., the fluid heated by the one or more components of printer head, such as the roller) is directed toward a heating element (which may be part of the printer head). For example, referring to FIG. 3B, heated fluid F2 is directed toward heating element 188. In some embodiments, the heated fluid is directed (at least in part) toward the heating element by the first device configured to direct fluid. In some embodiments, an optional second device configured to direct fluid directs the heated fluid toward the heating element. In some embodiments, the printer head includes the second device (e.g., a fan located in the printer head between the one or more components that are cooled and the heating element). For example, FIG. 3B depicts, in accordance with certain embodiments, optional second device 193*b*, which directs heated fluid F2 toward heating element 188. The second device can include one or more fans, ducts, or fluid directing devices. In some embodiments, the heated fluid is directed from the one or more components to the heating element via a duct (not pictured in FIG. 3B).

The flow of the heated fluid past or into contact with the heating element may result in heat being transferred from the heated fluid to the heating element or gas (e.g., air) in close proximity to the heating element. For example, in some embodiments, heated fluid F2 transfers heat to heating element 188 and/or gas F3 (shown as arrows in FIG. 3B). In some embodiments, the gas in close proximity to the heating element is heated by a combination of heat from the heated fluid and heat from the heating element. In some embodiments, supplemental heating of heating element 188 improves its efficiency and reduces power needed to reach an operating temperature to melt prepreg tape, other tapes, and FFF materials.

In some embodiments, the heating element 188 is any suitable element capable of heating a gas (e.g., air) to a temperature above the melting temperature of the thermoplastic of the tape may be suitable. In some such embodiments, the heating element heats the tape without contacting the tape. Rather, the heating element heats the tape by heating gas in close proximity to the heating element, and the gas subsequently heats the tape, in accordance with certain embodiments.

Referring to FIG. 3B, in accordance with certain embodiments, heating element 188 heats tape at region 191 by transferring heat to gas F3 (e.g., a hot air stream), which then heats the tape at region 191 (e.g., by convective heat flow). The heating of the gas in close proximity to the heating element may be assisted by the transfer of heat from the heated fluid directed toward the heating element 188 by the first device 185*b* and/or the second device 193*b* described herein (e.g., a first and second fan). Such heating of the tape may cause the tape to partially melt, thereby assisting in the bonding/consolidating of the tape during the 3D printing of a composite structure.

In some embodiments, the heating element 188 is a heat block. Supplemental heating lowers threshold to form part with prepreg tape in one embodiment, In some embodiments, the heat block (e.g., a copper heat block) is heated by a thermistor, while a thermocouple monitors and controls the temperature of the heat block via a feedback loop. In some embodiments, the heating element is an electrical resistance coil.

In some cases, the systems and methods relating to recyclable heating and cooling in 3D printing processes described herein are used in the system for manufacturing composite structures layer-by-layer, described herein. In some embodiments, the system includes a first printer head. The first printer head may be the printer head that includes the recyclable heating and cooling system described herein.

Figure 4:
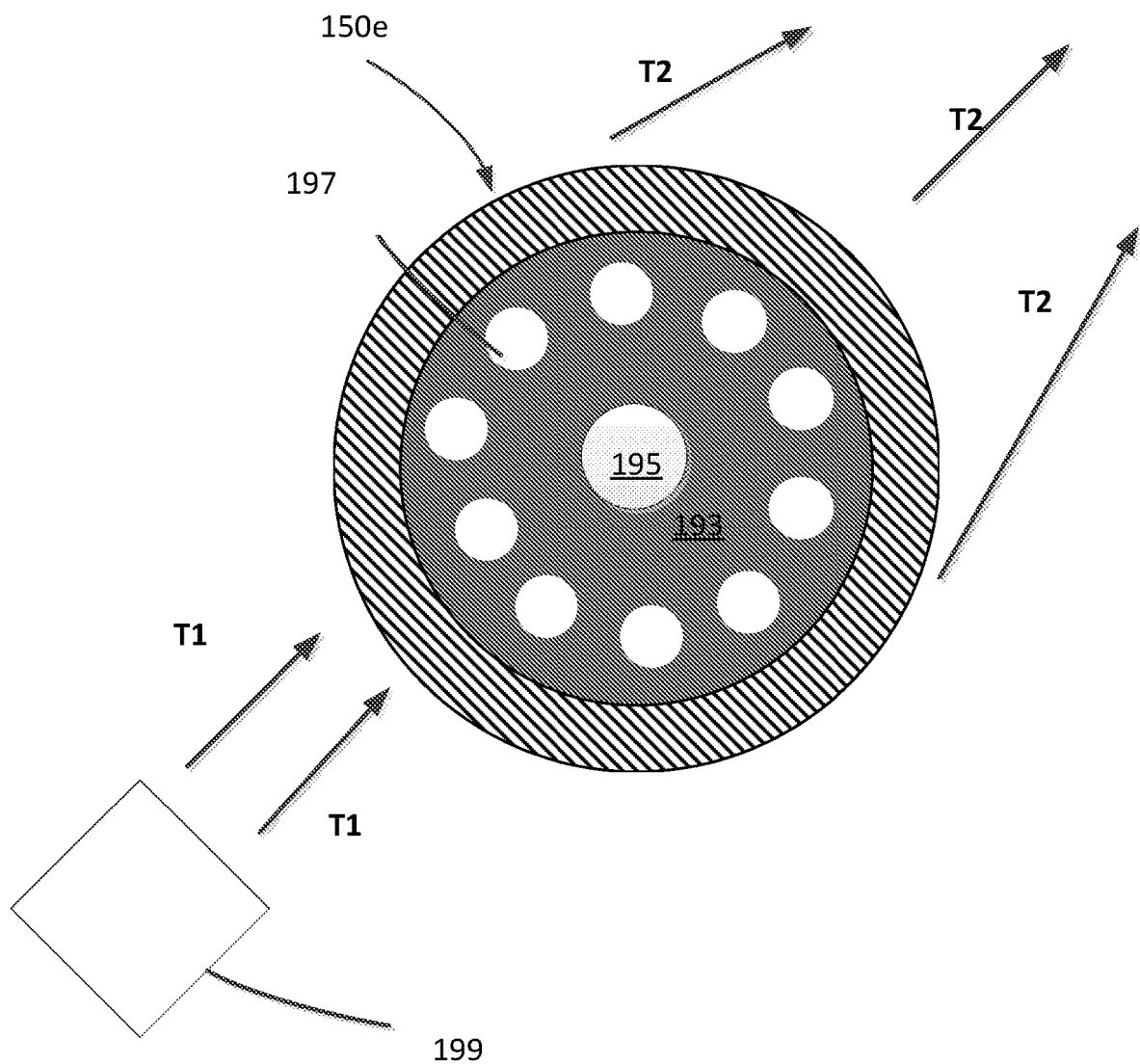
FIG. 4 is a schematic diagram showing a side view of a compaction roller of a tape-based print head, in accordance with embodiments described herein.

For example, FIG. 4 shows an exemplary illustration of such a roller 150*d*, in accordance with certain embodiments. Specifically, FIG. 4 shows a side view of a roller 150*d*. The compaction roller 150*e* may include a body 194 defining a longitudinal bore 195, wherein body comprises a metal, wherein body defines a plurality of holes or channels The holes along the outer perimeter of the roller 150*d* may, without wishing to be bound by any particular theory, allow for the transport of fluid (e.g., cooled air) though the rollers, assisting in the active cooling of the rollers. A fan or fluid source or cooling device 199 directs air or another fluid to the roller which results in heat transfer from roller to roller exiting or passing relative to roller. As shown, cooler air/fluid at a temperature T1 is heated by passing relative to roller to such that the air/fluid reach a temperature T2. This heat transfer cools the roller.

In some embodiments, the system described herein includes a device for actively cooling the rollers (e.g., the compaction rollers of a printer head). The cooling device 199 may, in certain embodiments, be capable of directing fluid toward the rollers. In some embodiments, the temperature of the fluid T1 is lower than the temperature of the rollers. Therefore, in some embodiments, heat is transferred from the rollers to the fluid, thereby cooling the rollers and heating fluid to T2.

In some, but not all, embodiments, the fluid directed toward the rollers by the device is a gas (e.g., air). In some embodiments, the fluid directed toward the rollers is a liquid (e.g., a cooled liquid). In some embodiments, the device 199 is a fan. The fan may, in certain embodiments, blow air at the rollers while the rollers are in operation. For example, in some embodiments, the rollers are compaction rollers as part of a printer head (e.g., the first printer head described herein), and as the compaction rollers apply pressure to a heated pre-impregnated tape, the fan flows air at the compaction rollers. In some cases, this active air flow contributes to faster cooling of the compaction rollers than passive cooling methods (such as methods in which the compaction rollers are exposed only to non-actively directed, room-temperature air).

In some embodiments, the device for actively cooling the rollers is fluidically connected to the rollers. In some embodiments, the device (e.g., a fan) is fluidically connected to the rollers (e.g., the compaction rollers) via a duct 190 that is attached to a mount to which the device is fixed (as shown in the schematic illustration in FIG. 3A) as well as to the rollers or a mount attached to the rollers. In some embodiments, the fluidic connection is 3D-printed. In some embodiments, the duct (e.g., the duct 190 in FIG. 3A) is 3D-printed. In some cases, the systems and methods for actively cooling rollers described herein are used in the system for manufacturing composite structures layer-by-layer, described herein.

Subtractive Manufacturing Techniques and Subsystems

Systems and methods relating to subtractive processing during 3D printing processes are generally described. In some embodiments, a device capable of performing a subtractive process on a material (e.g., by cutting, trimming, milling, or otherwise removing the material) is used in conjunction with a 3D printing system that prints structures including that material. In some embodiments, the 3D printing system includes a printer head. In some cases, the printer head is an extrusion/deposition head for a Fused Filament Fabrication (FFF) process. In some cases, the printer head is one configured to lay down continuous-fiber tape (e.g., that includes thermoplastic material). In some embodiments, the device capable of cutting or trimming a material is mounted on to the printer head (e.g., a printer head capable of depositing/extruding the material). In some cases, the 3D printing process is a layer-by-layer process, wherein layers of the material are deposited and in discrete steps. Such processes are additive processes.

Generally, with 3D printing processes such as FFF processes, there is a trade-off between the speed of the additive printing process, tolerances, and surface finish. Larger nozzles (e.g., in the print heads) are used in extrusion-based additive manufacturing methods to achieve faster speeds, but at the expense of tight tolerances. By employing subtractive processing techniques such as trimming the edges of a print after each layer, tolerances can, in certain embodiments, be improved dramatically while maintaining the desired faster printing speeds.

Figure 5A:
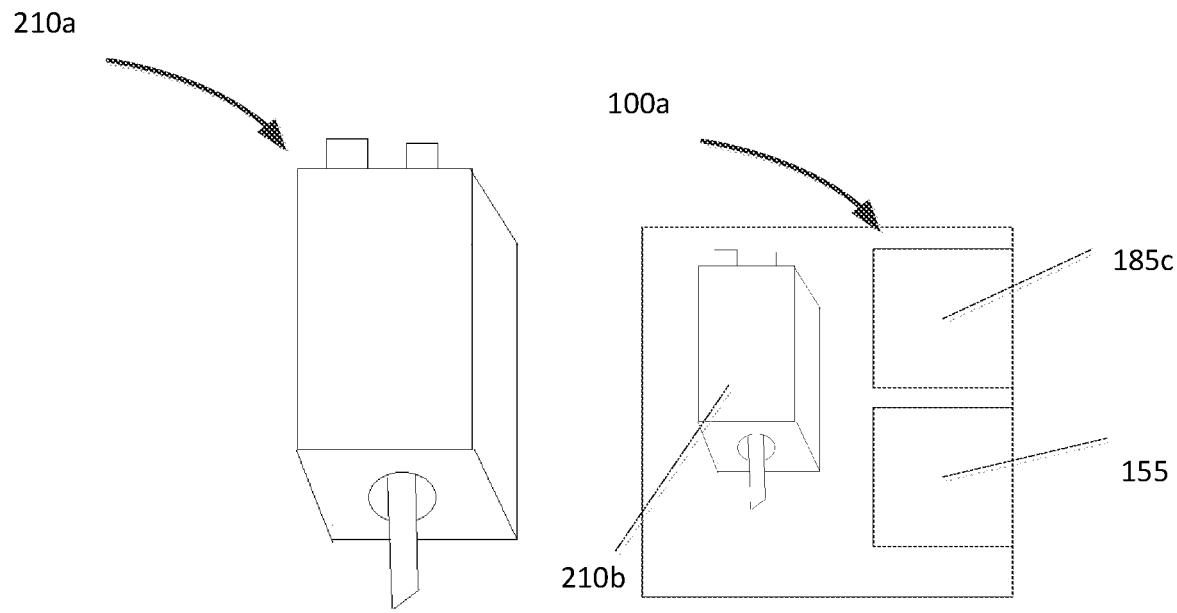
FIG. 5A is a schematic diagram of a subtractive device and a subtractive device integrated with a print head in accordance with an embodiment of the disclosure.

In some embodiments, the device capable of performing the subtractive process (referred to herein as a subtractive processing device) is a knife. In some embodiments, the subtractive processing device is an ultrasonic knife. FIG. 5A depicts exemplary subtractive devices 210a, 201b such as an ultrasonic knife/cutter, in accordance with certain embodiments. Ultrasonic knives use ultrasonic sound waves to create microscopic vibrations, which, in some cases, assist in cutting or trimming materials without requiring a significant range of motion. Ultrasonic knives suitable for the systems and methods described herein are commercially available from the following non-limiting list of vendors: Honda (USW 335 Ti) SharperTek, Dukane, Sonotec, and Cutra (Wondercutter). An ability to cut or trim materials without requiring a significant range of motion may be useful in performing subtractive processes during 3D printing.

In some embodiments, as mentioned herein, the subtractive processing device, generally 210, is mounted on to a printer head such as those shown in depicted in FIGS. 1, 2, 3A, 3B, and 5. FIG. 5A depicts a subtractive processing device 210a that may be used as a separate device controlled by a given printing system. Various cutters and material removers can be used for subtractive devices. In another embodiment, as shown in FIG. 5, a subtractive processing device 210b mounted on or integrated as part of a print head 100a. In some embodiments, the subtractive processing device 210 mounted on to the printer head 200 is an ultrasonic knife.

In some embodiments, the printer head 100a is part of a system for an FFF process, a prepreg tape fabrication process, a combination thereof or other polymer-based manufacturing. The print head 100a can include various components described herein with regard to print heads such as cooling system 185c. Other components 155 such as ducts, compaction rollers, detectors, and other components, systems, and subsystems as disclosed herein can be integrated in a given print head 100a.

Figure 5B:
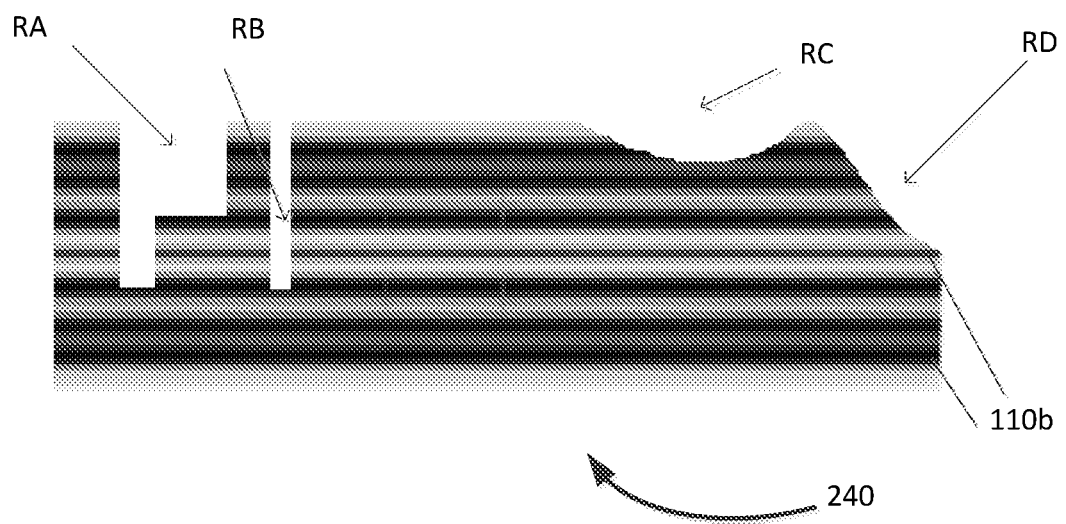
FIG. 5B is a schematic diagram of a part or workpiece formed from layers of segments of composite tape and/or polymer based filament that has been cut with a subtractive element to remove regions of volumes thereof in accordance with an embodiment of the disclosure.

As shown in FIG. 5B, a given workpiece or part such as part 240 can be operated upon or cut using subtractive device such as devices 210a, 210b and others disclosed herein. Various layers of prepreg tape or FFF materials 110b can be additively combined and laminated with compaction rollers. During the fabrication of part 240, a given subtractive device 210a, 210b, or others disclosed herein can be used to remove material from part 240 at various stages to form various channels, cores, cut outs, drop offs, curved regions, volumes or cavities, as shown by regions RA, RB, RC, and RD in the part 240. Each of these regions can be formed or cut by using a subtractive device 210a, 210b and others. The removal of the materials tape, filament, etc. used to make the part, can be performed intermittently, simultaneously with, or after tape lay down/printing or FFF-based printing.

Figure 6:
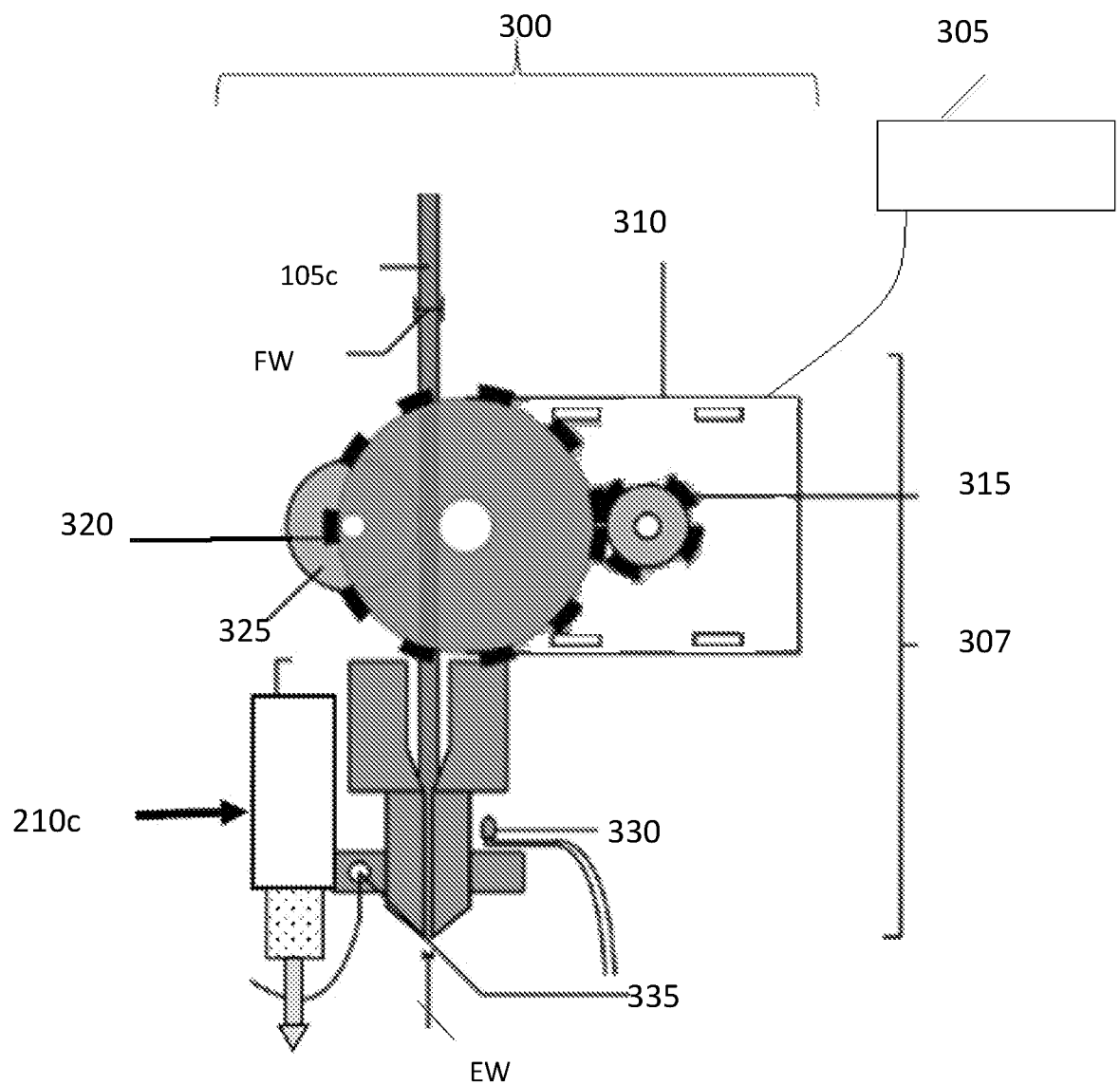
FIG. 6 is a schematic diagram of an embodiment of a fused filament fabrication (FFF) printer head suitable for use with various embodiments described herein.

FIG. 6 shows an exemplary print head 300. In one embodiment, print head 300 is a FFF-based print head that uses a polymer filament 105c that has a filament width FW. For example, referring again to FIG. 6, in accordance with certain embodiments, the printer head 300 shown in FIG. 2 is an FFF printer head 300. The print head 300 includes an extruder subsystem 307. A controller 305 such as a processor-based controller, microcontroller, or ASIC, can be used to control the motor and advancement of filament 105c. A motor 310 such as a stepper motor includes one or more small gears 315 which engage with and drive a larger gear 320 which engages one or more rollers that advance the filament 105c. One or more bearings 325 support the rollers and/or gears. A temperature sensor 330 is in communication with a controller and a heater 335. The heater 335 is used to bring filament to a working temperature for extrusion. The subtractive device 210c can cut and shape filament once it has been printed and also cut other material such as prepreg tape. The systems disclosed herein can print parts that include FFF-based material and tape-based material.

In general, various print heads can include an extruder, a heater, and a motor and a subtractive processing device such as an ultrasonic knife or cutter. In some embodiments, the device capable of performing a subtractive process (e.g., the ultrasonic knife), is contacted with a printed structure, and controlled movement of the printer head on which it is mounted results in the removal of material from the printed structure. For example, in some embodiments, the ultrasonic trimmer trims the perimeter of the material to create a suitable finish and ensure tolerances are being met. In some, but not all embodiments, this subtractive process is performed after the deposition of each layer of material (e.g., fused polymeric filament) by the printer head. The use of such a layer-by-layer subtractive method in conjunction with additive printing techniques may, in some cases, allow designers to slightly oversize their part, knowing that they do not need to achieve their target tolerance during the additive laying of the material. Instead, extra material is laid down and subsequently trimmed to achieve the desired tolerances with the added benefit of excellent surface finish (e.g., due to the precision of the ultrasonic cutter, in certain embodiments). In one embodiment, the disclosure relates to methods to reduce errors that cause a given finished part to deviate from a specified tolerance.

Non-stick Features and Subtractive Part Contouring

During some subtractive processes (e.g., in which a subtractive manufacturing elements such as an ultrasonic trimmer is mounted on to the first printer head, the second printer head, or a third printer head), it may be beneficial for certain regions of the laid down tape to not undergo consolidation/bonding (e.g., between layers of tape or between laid down tape and the polymer support/mold), so that the subtractive process can remove all of the desired material necessary to form the composite structure in its desired shape. For example, in some embodiments, a non-stick layer is deposited (e.g., by an additional printer head) on the region for which it is desired that no consolidation/bonding occur, such that the non-stick layer prevents bonding between layers at that region. In some embodiments, an inkjet printer head is used to deposit a relatively thin layer of non-stick material (e.g., a non-stick ink) between layers of tape (or between the support and a layer of tape) to prevent bonding.

Figure 7A:
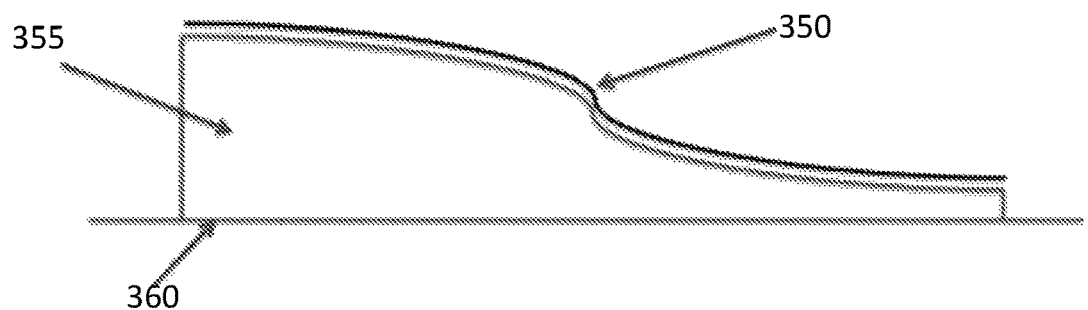
FIGS. 7A-7D are schematic diagrams showing various manufacturing steps by which a part or workpiece is fabricated using a tape-based material, such as a composite thermoplastic tape, and other supplemental processes such as printed supports, non-stick material deposition and others as described and depicted herein according to an embodiment of the disclosure

In some embodiments, the system described herein manufactures composite structures having non-flat shapes by first printing a non-flat polymer-based support or mold (e.g., with the second head described herein), and then laying tape (e.g., fiber-reinforced thermoplastic tape laid down by the first printer head described herein) on top of the support. FIG. 7A depicts an exemplary cross-sectional illustration of such a process, with a tape 350 laid down on a non-flat support 355. The support can include any of the materials disclosed herein. In one embodiment, the support is a plastic support or polymer such as PLA, ABS, PC, and other suitable materials. In some cases, the tape is not bonded to the non-flat support (e.g., the support is a separable support). The use of a non-flat support or mold may be useful in allowing for the manufacturing of composite structures that include concave regions without the use of subtractive manufacturing. In one embodiment, the support 355 is disposed in a print bed of a printing system that includes one or more print heads as disclosed herein. In one embodiment, support 355 is disposed within multi-layer part fabricated using a system as disclosed herein.

In some cases, however, subtractive manufacturing steps are desired to cut out material from consolidated tape layers to form desired shapes (e.g., concave regions) in the structure. In some cases such subtractive manufacturing is even desired in the case of a non-flat support. Subtractive manufacturing (e.g., via ultrasonic trimming or other milling processes) can be difficult in the case of bonded tape layers, because the bonding (e.g., between the bottom of one thermoplastic tape layer and the top of another thermoplastic tape layer) may prevent the complete removal of the material. In such cases, it is beneficial to deposit a thin layer of non-stick material (e.g., non-stick ink) between tape layers in order to prevent bonding and allow for complete removal of the desired material via subtractive manufacturing. Targeting regions of a part formed form thermoplastic tape (and other materials) for removal can be performed using various cutters, such as ultrasonic cutters. The printing of non-stick regions of materials relative to the layers of tape and materials used to make the part can further enhance separation of regions or volumes of the part. The use of non-stick materials support further post-processing and maintaining part surface conditions within design tolerances.

In some embodiments, the system described herein manufactures composite structures by laying down two-dimensional layers of fiber-reinforced tape (an additive process) followed by using subtractive manufacturing techniques to cut away any concave internal features to the part.

Figure 7B:
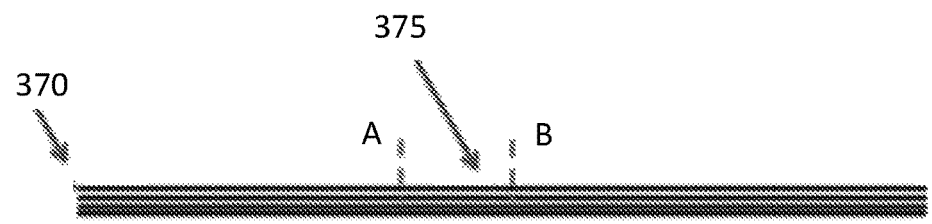

Laying down two-dimensional layers and then cutting out internal features following consolidation may allow for simpler support designs or allow for certain parts of the composite structures to not require supports at all during the printing process, which may increase processing time or simplify designs. The same consideration, however, regarding the difficulty of completely cutting out portions of material of consolidated tape layers that is described herein applies to these two-dimensional layer embodiments. FIG. 7B illustrates a cross-sectional illustration of two-dimensional tape layers 370, in accordance with certain embodiments, as well as an area to be cutout 375. Area 375 may be partially cut, but not cut through all the layers in one embodiment.

Figure 7C:
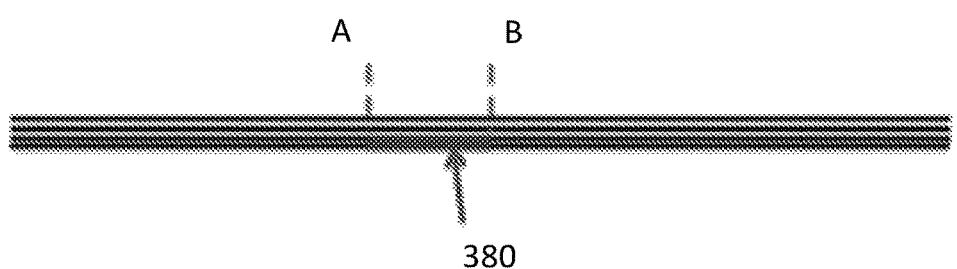

While the sides of the pictured material can be cut out (see dotted lines A, B)(e.g., with an ultrasonic trimmer or cutting head), the bottom portion where the thermoplastic tape has bonded with a previous layer may not be able to be cut out, preventing the formation of the desired shape. As described herein, in some embodiments, a thin layer of non-stick material (e.g., non-stick ink) or one or more regions of non-stick material may be deposited between tape layers 370. FIG. 7C shows an illustration of such a non-stick layer or region 380 deposited between tape layers. The non-stick region 380 (or layer), which may be an ink in accordance with certain embodiments, may prevent bonding between tape layers (e.g., during a consolidation step), thereby allowing for complete extraction of the desired material to create the desired shape for the composite structure.

The printing system described herein may include a separate printer head configured to deposit the non-stick layers/regions 380 described herein. For example, in some embodiments, the system includes an inkjet printer head configured to deposit thin layers of ink on top of laid-down tape and/or polymer supports in order to prevent bonding between layers in the regions on which the ink is deposited. Therefore, an exemplary printing process may include the second printer head depositing a support structure, followed by the second printer head being swapped for the first printer head described herein via an automatic tool-changing process on a motion platform. In various embodiments, tool may refer to print heads and other printing or deposition devices or other devices that move relative to part being fabricated.

The first printer head may then lay down a layer of fiber-reinforced tape, followed by the first printer head being swapped via tool changing for a head that includes an inkjet printer head, which lays down a thin layer of suitable ink on a portion of the laid down tape. The first printer head may then be swapped in again to lay down a second layer of tape. In turn, the first printer head or another head can consolidate the two layers of tape where no non-stick layer/region of ink was deposited, while not consolidating the two layers in the region where the non-stick layer of ink was deposited. Finally, the subtractive manufacturing element removes material where the non-stick thin layer of ink was deposited to achieve the desired shape. This process can be used to form various regions RA-RD as shown in FIG. 5B. Some layers 110b, in FIG. 5B can include one or more regions or layers of non-stick material.

As described herein, non-stick layer may be relatively thin. Having a relatively thin non-stick layer (e.g., a thin ink layer) may prevent wrinkling from occurring when a layer of tape is laid down on top of the non-stick layer. In other words, having a the non-stick layer be thin may allow for the next layer of tape to be laid down flat as opposed to being laid down with undesired out-of-plane features. Such wrinkles or out-of-plane features may hinder consolidation in areas where consolidation is desired.

Figure 7D:

FIG. 7D depicts an illustration of an undesired out-of-plane wrinkle or bubble 385 formed by the laying down of a tape layer on top of an insufficiently thin non-stick layer/region 390. In some embodiments, the non-stick layer has a thickness of less than or equal to about 100 µm, less than or equal to about 75 µm, less than or equal to about 50 µm, less than or equal to about 25 µm, less than or equal to about 20 µm, less than or equal to about 15 µm, less than or equal to about 10 µm, less than or equal to about 5 µm, less than or equal to about 2 µm, less than or equal to about 1 µm, less than or equal to about 0.75 µm, less than or equal to about 0.5 less than or equal to about 0.4 µm, less than or equal to about 0.2 µm, less than or equal to about 100 nm, or less. Other ranges of thicknesses are possible.

In some embodiments, the non-stick layer may be relatively thin in comparison to the thickness of the tape being laid down (e.g., by the first printer head). Having a thickness significantly smaller than that of the tape may limit the degree to which the non-stick layer causes out-of-plane distortions or wrinkles in the tape layers. In some embodiments, the thickness of the non-stick layer is less than or equal to about 20%, less than or equal to less than or equal to about 10%, less than or equal to about 5%, less than or equal to less than or equal to about 2%, less than or equal to about 1%, less than or equal to about 0.5%, less than or equal to about 0.1%, or less than or equal to about 0.01% the thickness of the tape upon which and/or underneath which the non-stick layer is deposited.

The material deposited to form the non-stick layer described herein may include any number of compositions, provided that they do not bond to the thermoplastic polymers of adjacent tape layers under the conditions (e.g., temperature, pressure) applied during the printing process or other printable materials as may be used in various embodiments. For example, the material deposited to form the non-stick layer may include certain inks, such as off-the-shelf printer inks that include ceramic particles. In some embodiments, the material deposited to form the non-stick layer includes certain polymers such as polylactic acid (PLA) or polyether ether ketone (PEEK).

In some, but not all embodiments, the material is made up of greater than or equal to 99 wt % of the certain polymers (e.g., PLA and/or PEEK). In some cases, the certain polymers (e.g., PLA and/or PEEK) are deposited with a certain combination of temperature and pressure such that the non-stick layer does not bond to the underlying composite tape materials. The type of material to be deposited (e.g., type of ink or polymer) may depend on the thermoplastic material of the tape being laid down as well as the printing conditions. For example, in some embodiments, the material (e.g., ink) deposited to form the non-stick layer is a high-temperature material, with a melting temperature greater than or equal to the thermoplastic material of the tape upon which and/or underneath which the non-stick layer is deposited.

In some embodiments, a system for manufacturing composite structures via a layer-by-layer technique is generally described. The non-stick layers described herein may, in some embodiments, be used in combination with the printing system described herein.

Print Head/Tool Changing Features

The disclosure also relates to systems and methods of tool/print head changing during the layer-by-layer assembly of composite structures. In one aspect, a 3D printing system that includes a motion platform and multiple modular heads are provided. The heads may, in some embodiments, may be used for manufacturing high quality continuous fiber reinforced structural parts. In some embodiments, the heads are modular print heads as well or other types of heads, such as heads that includes subtractive manufacturing elements. The motion platform of the printing system may include a tool changing element that allows the motion platform to automatically switch or swap between the multiple heads to which the motion platform is coupled (e.g., via an xyz gantry), in a process referred to herein as tool changing.

In part, by having a system with tool changing capability (i.e., an ability to automatically switch or swap which head is used during certain steps of the printing process), the system may be used to efficiently fabricate complex composite structures made of multiple types of materials without the use of multiple different printing systems, pausing the fabrication process to swap manually swap heads, or fitting a large number of heads on to the motion platform (or the gantry itself) at the same time.

In some embodiments, the system includes a first printer head configured to lay down tape (e.g., a thermoplastic tape that includes continuous fibers). In certain embodiments, the system further includes a second printer head configured to deposit material (e.g., by extruding polymeric filaments). In some embodiments, the system includes a third head that includes a subtractive manufacturing element (e.g., an ultrasonic trimmer) configured to trim or mill portions of the composite material laid down. In some embodiments, each of the first printer head, second printer head, and third head are configured to couple with a tool changing element of the motion platform. Accordingly, the system may then have a capability of swapping between the first printer head, second printer head, or third head as needed during different steps of the printing process. In some cases, the first printer head, second printer head, and third head may be used together to rapidly fabricate high quality structural parts suitable for a variety of applications (e.g., aerospace-grade composite material systems at aerospace quality).

In some aspects, the fabrication of the composite structures occurs via additive and/or subtractive processes. In some embodiments, the second printer head deposits a mold structure, and, subsequently, the second printer head is swapped (e.g., via tool changing) in the motion platform for the first printer head, which lays down a layer of tape onto the mold structure (an additive process), at which point the first printer head is swapped for the third head, which machines the laid-down tape (e.g. via ultrasonic cutting or milling, a subtractive process). In some embodiments, the first printer head is swapped in to the motion platform and then lays down an additional layer of tape and consolidates the additional layer of tape with the laid-down tape (e.g., via a combination of heat and/or compaction force, as described herein).

In some embodiments, the first printer head, second printer head, and third head, as well as the tool changing of the heads on the motion platform, are robotically controlled. In some embodiments, the system may include an optional fourth head, an optional fifth head, or more, each of which is different from the first printer head, second printer head, and third head, depending on the requirements of the structure being manufactured, as described herein.

Figure 8A:
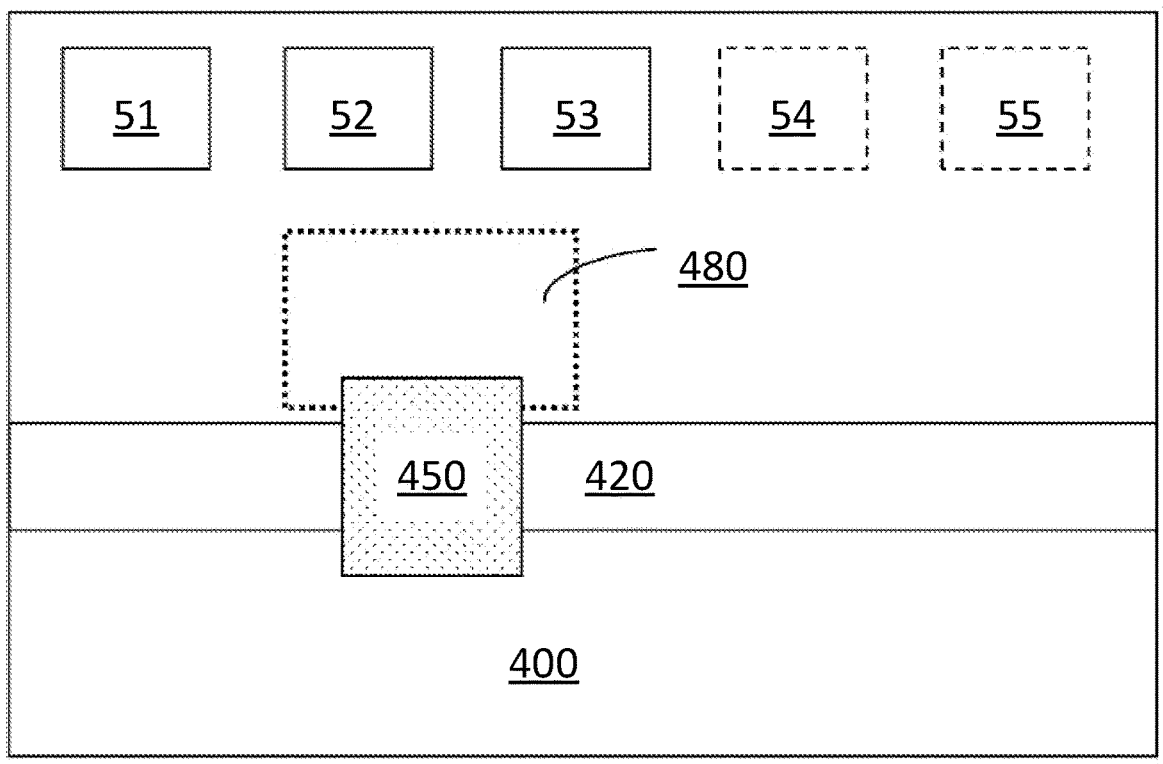
FIGS. 8A and 8B are schematic diagrams showing various swappable print heads relative to a robotic gantry or other movement system in accordance with an embodiment of the disclosure.

FIG. 8A depicts an exemplary schematic of a top-down view of system that uses tool changing as described herein, in accordance with certain embodiments. FIG. 8A shows motion platform 400 that includes gantry 420 and tool changing element 450 attached to gantry 420. Tool changing element 450 is capable of coupling with any one of first printer head 51, second printer head 52, or third head 53 (or optional heads 54 or 55). In some embodiments, the tool changing element couples to a printer head (e.g., via translation of the tool changing element via the gantry such that the tool changing element comes into contact and couples with the printer head). In FIG. 8, print head 51 is coupled to tool changing element 450. The gantry is disposed above a print head and may be within or adjacent a housing.

Once coupled, the gantry may translate the tool changing element and the now-coupled printer head to the portion of the motion platform where printing (e.g., printing a composite structure or mold for a composite structure) is to take place. For example, referring to FIG. 8B, tool changing element 450 may be translated by gantry 420 to come into contact and couple with first printer head 51, and which, once coupled can be translated to portion 480 of motion platform 400 where printing is to take place. At a later point in time, the gantry and tool changing element may return the printer head to its original location away from the portion of the motion platform where printing is to take place and decouple the printer head. The tool changing element can then translate to and couple to a different printer head (e.g., the second printer head, or the third head).

Figure 8B:
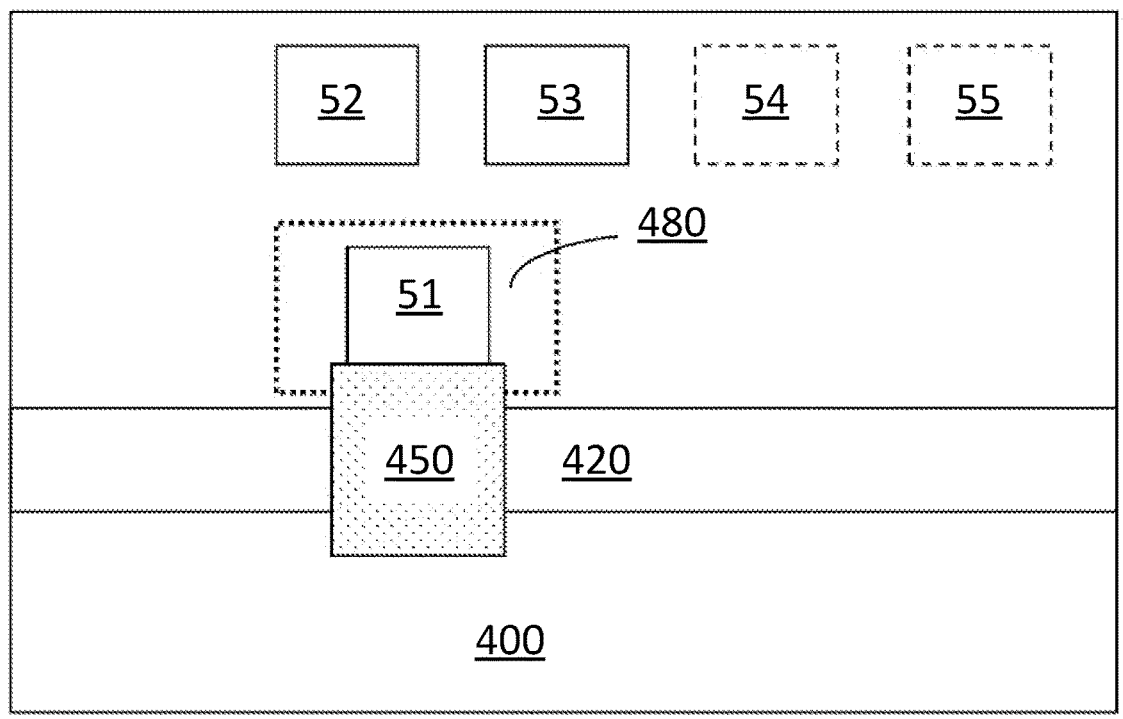

For example, as shown in FIGS. 8A and 8B, in accordance with certain embodiments, after laying down fiber-reinforced tape at portion 480 of motion platform 400, first printer head 51 may be returned to its original location and decoupled from tool changing element 450, and subsequently, tool changing element may couple to third head 53 (i.e., first head 51 is swapped with third head 53) that includes, in accordance with certain embodiments, a subtractive manufacturing element such as an ultrasonic trimmer, which can be translated to over to the laid-down tape at portion 480 of motion platform 400 and then trim the laid-down tape structure as desired. Numerous combinations and sequences of swapping and using the modular heads via tool changing are possible, depending on the design and requirements of the structure desired to be manufactured.

In some embodiments, the tool changing of the system described herein allows for efficient swapping between different types tape-laying print heads (e.g., print heads that lay down fiber-reinforced thermoplastic tape like the first printer head described herein). For example, in some embodiments, the system includes the first printer head described herein and a fourth printer head. In some embodiments, the fourth printer head is relatively similar to the first printer head, but lays down a tape having a different width than the tape of the first printer head.

Referring to FIG. 8A and in accordance with certain embodiments, first printer head 51 is configured to lay down tape having a first width and fourth printer head 54 lay down tape having a second width, wherein the first width and second width are different. Having different printer heads that lay down or otherwise deposit tape with different thicknesses, and being able to easily switch between the different heads via a head/tool changing process is advantageous. For example, when manufacturing a structure, during flatter parts, it may be advantageous to deposit wider tapes to increase process speeds, while when finer resolution is required, it may be advantageous to use narrower tapes. Swapping between the two different tape-laying printer heads (e.g., the first printer head and the optional fourth printer head) can therefore lead to more efficient processing.

In some embodiments, the fourth printer head 54 is relatively similar to the first printer head, but lays down a tape that includes a different material altogether than that of tape of the first printer head (e.g., the a tape that includes a different type of fiber or different type of thermoplastic polymer). For example, the first printer head may lay down a tape that includes one type of fiber (e.g., carbon fiber), while the fourth printer head may lay down a tape that includes a second, different type of fiber (glass fibers). In some embodiments, this may allow for the efficient manufacturing of composite having a core structure of one material (e.g., carbon-fiber reinforced thermoplastic) and an outer layer of another material (e.g., fiberglass). Other beneficial configurations are also envisioned, including, for example, ones in which metal structures are printed within composite layers (e.g., a copper mesh printed within a layer to create a lightning strike protection material system).

In some embodiments, the tool changing of the system described herein allows for efficient swapping between different types of filament-extruding print heads (e.g., printer heads that extrude polymer filament to create support structures or molds, such as FFF heads). For example, in some embodiments, the system includes the second printer head described herein and a fifth printer head. In some embodiments, the fifth printer head is relatively similar to the second printer head, but extrudes a different polymer than the polymer extruded by the second printer head.

For example, referring to FIG. 8B and in accordance with certain embodiments, second printer head 52 is configured to extrude polymer of a first type and fifth printer head 55 extrudes polymer of second type, wherein the first type of polymer and second type of polymer are different. Having support (or different parts of the same support) made of different polymers may be beneficial, especially in cases where the supports are used in combination with fiber-reinforced thermoplastic tape for making high quality composites.

For example, in some embodiments at least a portion of a support may be bonded directly to the thermoplastic tape (e.g., laid down by the first printer head). An example of such an embodiment is a sandwich composite where the composite facesheets bond to a plastic internal core. In some embodiments, at least a portion of the support may be desired to separable from the thermoplastic tape (i.e., no bonding between the polymer of the support and the thermoplastic tape). Having two different polymer-extruding heads (e.g., two different FFF heads, one which extrudes polymer that can bond to the tape, the other which extrudes polymer that does not bond to the tape) that can be automatically swapped via tool changing on the motion platform is therefore beneficial.

The different heads may be coupled to (and decoupled from) the tool changing element via a number of suitable known techniques. For example, in some embodiments the heads (e.g., the first printer head, the second printer, the third head including a subtractive manufacturing element) are coupled (and decoupled) to the tool changing element via kinematic couplings. Other coupling techniques include using rigid couplings such as those that feature clevis pin connections and/or threaded studs, other grips, clamps, or fixtures that can mechanically, pneumatically, or magnetically provide attachment points for the various heads.

While embodiments having three, four, or five different heads that can be swapped via tool changing have been described herein, the methods and systems described herein are scalable and can be used for any suitable number of heads (and types of heads), depending on the size of the motion platform, the available space, and the desired applications.

In some embodiments, a system for manufacturing composite structures via a layer-by-layer technique is generally described.

Composites, FFF, Polymer and Other Materials for Additive and Subtractive Manufacture In some embodiments, the tape includes a matrix or carrier. In one embodiment, the matrix or carrier is a thermoplastic material such as a thermoplastic polymer. Examples of suitable matrixes or carriers for used with fibers includes, without limitation, polyether ether ketone (PEEK), polyaryletherketone (PAEK), polyetherketoneketone (PEKK), polypropylene (PP), polyetherimide (PEI), polyamide (PA), polyphenylene sulfide (PPS), polypropylene polybenzyl isocyanate (PPI), and polyethylene (PE). Matrices that include combinations of thermoplastic polymers are also possible.

In various embodiments, the carrier is a polymeric material. In one embodiment, the carrier includes one or more components selected from the group consisting of a polymer, a cross-linking agent, a resin, a thermoset material, a thermoplastic material, and a catalytic agent.

Any fiber suitable for the desired impregnation into a tape may be used. Examples of suitable fibers impregnated into the tape include, but are not limited to, carbon fibers (e.g., AS4, IM7, IM10), metal fibers, glass fibers (e.g., E-glass, S-glass), and Aramid fibers (e.g., Kevlar). Multiple different types of fibers may be impregnated into the tape, in accordance with certain embodiments. Suitable pre-impregnated tapes can be purchased from a variety of commercial vendors, including Toray/TenCate, Hexcel, Solvay, Barrday, Teijin, Evonik, Victrex, or Suprem.

In some embodiments, the tape has a certain width. In some embodiments, the width is greater than or equal to about 1 mm, greater than or equal to about 1.5 mm, greater than or equal to about 2.0 mm, greater than or equal to about 2.5 mm, or greater than or equal to about 3.0 mm. In some embodiments, the width of the pre-impregnated tape is less than or equal to about 20.0 mm, less than or equal to about 15.0 mm, less than or equal to about 10.0 mm, less than or equal to about 8.0, less than or equal to about 6.0 mm, less than or equal to about 5.0 mm, or less. Combinations of the above ranges and other ranges disclosed herein are possible, for example, in some embodiments, the width of the tape is greater than or equal to about 1 mm and less than or equal to about 20.0 mm. The tape may be wound on to a spool or cassette prior to being introduced to a tape receiver or routing mechanism. In one embodiment, a first roller is used to receive the tape.

In one embodiment, the systems and methods of the disclosure can be used with various fiber reinforced tows. A given tow includes M continuous fibers that are arranged within a carrier or matrix of the tow. The fibers in the tow can include any of the fibers disclosed herein and can have various cross-sectional geometries. Typically, each fiber in a tow has a substantially cylindrical cross-section and ranges from about 1 to about 20 micrometers in diameter. The number of fibers in a given tow is typically in the thousands (K). Accordingly, a 9K tow has approximately 9,000 fibers that are adjacent each other, disposed in a carrier/matrix and span the length of the tow or a given section thereof. Notwithstanding the foregoing, tows that include reinforcing fibers in the range of about 100 to about 1000 can be used with various system embodiments.

The terms "about" and "substantially identical" as used herein, refer to variations in a numerical quantity that can occur, for example, through measuring or handling procedures in the real world; through inadvertent error in these procedures; through differences/faults in the manufacture of materials, such as composite tape, through imperfections; as well as variations that would be recognized by one in the skill in the art as being equivalent so long as such variations do not encompass known values practiced by the prior art. Typically, the term "about" means greater or lesser than the value or range of values stated by $1/10$ of the stated value, e.g., ±10%.

For instance, applying a length of composite tape of about 12 inches to an element can mean that the composite tape is a length between 10.8 inches and 13.2 inches. Likewise, wherein values are said to be "substantially identical," the values may differ by up to 5%. For instance, a strip of composite tape is a long rectilinear shape, both before and after the application of heat, even though applying heat can affect the shape of the composite tape. Whether or not modified by the term "about" or "substantially" identical, quantitative values recited in the claims include equivalents to the recited values, e.g., variations in the numerical quantity of such values that can occur, but would be recognized to be equivalents by a person skilled in the art. In various embodiments, tape segments maintain a substantially identical rectangular shape before and after processing in various embodiments subject to some minor variations as described herein.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

When values or ranges of values are given, each value and the end points of a given range and the values there between may be increased or decreased by 20%, while still staying within the teachings of the disclosure, unless some different range is specifically mentioned.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

It is to be understood that the figures and descriptions of the disclosure have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the disclosure, a single component may be replaced by multiple components, and multiple components may be replaced by a single component, to provide an element or structure or to perform a given function or functions. Except where such substitution would not be operative to practice certain embodiments of the disclosure, such substitution is considered within the scope of the disclosure.

The examples presented herein are intended to illustrate potential and specific implementations of the disclosure. It can be appreciated that the examples are intended primarily for purposes of illustration of the disclosure for those skilled in the art. There may be variations to these diagrams or the operations described herein without departing from the spirit of the disclosure. For instance, in certain cases, method steps or operations may be performed or executed in differing order, or operations may be added, deleted or modified.

What is claimed is:

1. A method of manufacturing a part comprising:
   printing a three-dimensional support, using a fused filament fabrication-based print head, wherein the support comprises layers of fused polymer filament;
   heating one or more segments of prepreg thermoplastic tape, using a heating element disposed in a tape deposition head;
   depositing one or more heated segments of prepreg thermoplastic tape on the three-dimensional support in one or more directions;
   cooling a compaction roller of the tape deposition head using a fan to direct air having a first temperature relative to a surface of the compaction roller such that temperature of the compaction roller decreases;
   directing heated air from the compaction roller having a second temperature to one or more heating elements disposed in the tape deposition head, wherein second temperature is higher than first temperature;
   compacting, the one or more segments of prepreg thermoplastic tape such that the one or more segments conform to the support; and
   repeating depositing and compacting steps and periodically changing the one or more directions until a fiber-reinforced multi-layer part comprising one or more surfaces is formed, wherein at least one surface of the one or more surfaces is defined by the support.

2. The method of claim 1, wherein the support is a mold defining one or more shaped regions or volumes, wherein the one or more shaped region are covered by an arrangement of the one or more segments.

3. The method of claim 1, wherein compaction roller comprises an elongate bore defined by a unitary body, wherein unitary body defines a plurality of holes or channels.

4. The method of claim 1, further comprising depositing one or more regions of non-stick material using the fused filament fabrication-based print head.

5. The method of claim 4, further comprising removing a first volume of compacted layers of thermoplastic tape segments using a subtractive device.

6. The method of claim 5, wherein the first volume is defined by one or more regions of non-stick material.

7. The method of claim 1, wherein all steps are performed in a working region of a printing system, wherein working region is within housing of printing system.

8. The method of claim 1 further comprising covering a first surface of support with a sufficient number of segments of prepreg thermoplastic tape such that the first surface is covered.

9. The method of claim 1 further comprising detecting a splice in a section of prepreg thermoplastic tape.

10. The method of claim 9 further comprising cutting prepreg thermoplastic tape relative to the section; and removing splice.

11. The method of claim 1, wherein the support is a lattice or honeycomb core.

12. The method of claim 1, wherein the support is disposed within or remains integral with fiber-reinforced multi-layer part.

13. The method of claim 1 further comprising removing support, wherein support is disposable.

* * * * *